(12) United States Patent
Heninger et al.

(10) Patent No.: US 11,780,118 B2
(45) Date of Patent: Oct. 10, 2023

(54) METHOD FOR IMPREGNATION A POLYMERIC GRANULATE WITH A PHYSICAL BLOWING AGENT

(71) Applicant: Messer Industries USA, Inc., Bridgewater, NJ (US)

(72) Inventors: Rolf Heninger, Höhenkirchen-Siegertsbrunn (DE); Andreas Praller, Germering (DE); Andreas Kürten, Iserlohn (DE); Pawel Szych, Munich (DE)

(73) Assignee: Messer Industries USA, Inc., New Castle, DE (US)

( * ) Notice: Subject to any disclaimer, the term of this patent is extended or adjusted under 35 U.S.C. 154(b) by 0 days.

(21) Appl. No.: 16/760,090

(22) PCT Filed: Oct. 23, 2018

(86) PCT No.: PCT/EP2018/025271
§ 371 (c)(1),
(2) Date: Apr. 29, 2020

(87) PCT Pub. No.: WO2019/086144
PCT Pub. Date: May 9, 2019

(65) Prior Publication Data
US 2020/0353647 A1 Nov. 12, 2020

Related U.S. Application Data

(60) Provisional application No. 62/579,199, filed on Oct. 31, 2017.

(51) Int. Cl.
| | |
|---|---|
| *B29C 44/34* | (2006.01) |
| *B29B 9/16* | (2006.01) |
| *C08J 9/16* | (2006.01) |
| *B29B 13/02* | (2006.01) |
| *B29B 13/06* | (2006.01) |
| *C08J 9/12* | (2006.01) |
| *B29K 23/00* | (2006.01) |
| *B29K 25/00* | (2006.01) |
| *B29K 69/00* | (2006.01) |
| *B29K 101/12* | (2006.01) |
| *B29K 105/00* | (2006.01) |

(52) U.S. Cl.
CPC .............. *B29B 9/16* (2013.01); *B29B 13/02* (2013.01); *B29B 13/065* (2013.01); *B29C 44/3453* (2013.01); *B29C 44/3461* (2013.01); *C08J 9/122* (2013.01); *B29B 2009/161* (2013.01); *B29K 2023/12* (2013.01); *B29K 2025/06* (2013.01); *B29K 2069/00* (2013.01); *B29K 2101/12* (2013.01); *B29K 2105/251* (2013.01); *C08J 2201/036* (2013.01); *C08J 2203/06* (2013.01); *C08J 2323/12* (2013.01); *C08J 2325/06* (2013.01); *C08J 2369/00* (2013.01)

(58) Field of Classification Search
CPC ......... B29B 9/16; B29B 13/02; B29B 13/065; B29B 2009/161; B29B 13/00; B29C 44/3453; B29C 44/3461; C08J 9/122; C08J 2201/036; C08J 2203/06; C08J 2323/12; C08J 2325/06; C08J 2369/00; B29K 2023/12; B29K 2025/06; B29K 2069/00; B29K 2101/12; B29K 2105/251
See application file for complete search history.

(56) References Cited

U.S. PATENT DOCUMENTS

| | | | |
|---|---|---|---|
| 4,473,665 A | 9/1984 | Martini-Vvedensky | |
| 2002/0014709 A1* | 2/2002 | Arai | ................... B29C 44/3453 264/40.6 |
| 2004/0070098 A1* | 4/2004 | Arai | ................... B29C 44/3453 264/51 |
| 2016/0297943 A1 | 10/2016 | Däschlein et al. | |
| 2017/0283575 A1 | 10/2017 | Akuta et al. | |
| 2019/0203009 A1* | 7/2019 | Keppeler | ............ B29C 44/3461 |

FOREIGN PATENT DOCUMENTS

| | | |
|---|---|---|
| EP | 0765724 A2 | 4/1997 |
| JP | 2003261707 A | 9/2003 |

OTHER PUBLICATIONS

PCT International Search Report for PCT/EP2018/025271, dated Feb. 19, 2019, Authorized Officer: Peter Mans, 3 pgs.

\* cited by examiner

*Primary Examiner* — K. Boyle
(74) *Attorney, Agent, or Firm* — Joshua L. Cohen

(57) ABSTRACT

A method for impregnating a polymeric granulate with a physical blowing agent is disclosed. The polymeric granulate can be a typical material such as a polycarbonate that is used in foam injection moulding processes. The physical blowing agent can be carbon dioxide which impregnates that polymeric granulate at a temperature range of 40° to 120° C. and a pressure range of 15 to 55 bar. Preferably, the polymeric granulate is heated in a range of 50° to 90° with a range of 60° to 80° preferred. A pressure range of 25 to 45 bar is preferred with a range of 30 to 40 bar more preferred.

9 Claims, 1 Drawing Sheet

METHOD FOR IMPREGNATION A POLYMERIC GRANULATE WITH A PHYSICAL BLOWING AGENT

BACKGROUND OF THE INVENTION

The invention relates to a method for impregnating a polymeric granulate with a physical blowing agent before the polymeric granulate is used in an injection moulding process.

Injection moulding is a manufacturing process for producing parts by injecting molten material into a mould. Injection moulding is commonly carried out with a polymeric material, for example thermoplastic and thermosetting polymers. The polymeric material is injected into the mould cavity, where it cools and hardens to the configuration of the mould.

The injection moulding process can be improved by impregnating the polymeric granulate with a physical blowing agent such as carbon dioxide prior to the injection moulding process being undertaken. In the injection moulding machine, the blowing agent remains dissolved in the melted polymeric granulate due to the high pressure. Upon injecting the melted polymeric granulate into the mould with the corresponding pressure drop, the blowing agent bubbles up and gives the product a microcellular structure. Such a process is also known as foam injection moulding. By foam injection moulding, an advantage is realized versus regular compact material in both a weight loss and cost savings.

The level of weight saving will depend in part on the amount of blowing agent which can be introduced into the granulate before its introduction into the injection moulding machine.

Ideally, the blowing agent once absorbed remains in the granulate until it is processed in the injection moulding machine. Both absorption and desorption follow a parabolic function as shown in FIGS. 1 and 2 described in greater detail below. While the impregnation of the polymer with the blowing agent is typically a batch process, the injection moulding is virtually continuous. The target is to use a batch as long as possible, roughly 1 to 2 hours. Accordingly, the polymeric granulate must be overcharged with blowing agent in order to contain enough blowing agent after 1 to 2 hours as necessary to achieve the desired weight reduction.

Thus, it is an object of the present invention to provide process parameters for impregnation of a polymer to optimize a subsequent foam injection moulding method.

In particular, it is an object to provide a temperature range and a pressure range for the impregnation step which allow a fast impregnation of the polymer granulate with the blowing agent but a slow desorption of the blowing agent from the polymer granulate.

SUMMARY OF THE INVENTION

The present inventors have discovered that the claimed combination of pressures and temperatures will improve the process whereby a physical blowing agent is impregnated into a polymeric granulate before the polymer granulate is used in an injection moulding process.

According to the invention a polymeric granulate is impregnated with a physical blowing agent at a temperature of 40° to 120° C. and at a pressure of 15 to 55 bar before the polymeric granulate is used in an injection moulding process.

At a first glance, high pressures should be advantageous as the impregnation should be accelerated. However, too high pressures will require an investment in high pressure resistant vessels. Further, there will be high gas consumption due to gas not being absorbed in the polymer being lost when the pressure balance returns to ambient pressures. Both can add to the expense of the operation. Thus, it has been found that a pressure range between 15 bar and 55 bar is a good compromise between the above-mentioned advantages and disadvantages.

Regarding the temperature for granulate impregnation, it must be considered that many polymeric granulates need to be dried prior to injection moulding. Such drying is typically carried out at temperatures between 60° to 120° C. Thus, if the impregnation of the granulate is carried out at ambient temperature (20° C.) or even lower, the granulate would have to be cooled down to ambient temperatures for impregnation in order to maintain stable conditions in the impregnation. Of course, later in the injection moulding step, the polymeric granulate is heated up in temperature again. Both these steps result in an unwanted waste of energy.

Further, temperatures for granulate impregnation close to ambient have the disadvantage that the diffusion of the blowing agent into the polymer grain is relatively slow. Even after two hours of impregnation time, the blowing agent has not penetrated the grain very deeply and accumulates along the edge layer. Therefore, the desorption after the pressure balance with ambient pressures is too fast. This will restrict the time the treated granulate can be used for injection moulding. If too much blowing agent escapes from the polymeric granulate before it is used in the injection moulding machine, the ability to achieve foaming is considerably reduced. Therefore, the present invention suggests impregnating the polymeric granulate at a temperature between 40° C. and 120° C.

The term "impregnation" shall mean that the granulate polymer is exposed to or contacted with a physical blowing agent and that the physical blowing agent is taken up or absorbed by the polymer or the blowing agent adheres to the polymer or is adsorbed to the polymer surface. If not explicitly stated to the contrary, the terms "impregnate" and "absorb" are used as synonyms irrespective of the physical phenomena behind the impregnation.

Ideally, after impregnation the blowing agent remains in the granulate until it is processed in the injection moulding machine. Both absorption and desorption follow a parabolic function as shown in FIGS. 1 and 2 described in greater detail below.

While the impregnation is typically a batch process, the injection moulding is virtually continuous. The target is to use a batch as long as possible, roughly 1 to 2 hours. Accordingly, the polymeric granulate must be overcharged with blowing agent in order to contain enough blowing agent after 1 to 2 hours as necessary to achieve the desired weight reduction.

Preferably the polymer granulate comprises a thermoplastic resin, a thermoset resin, a thermoplastic particle foam, a granulate for the production of a thermoplastic particle foam, polypropylene, expanded polypropylene (EPP), polystyrene, expanded polystyrene, or polycarbonate.

According to a preferred embodiment of the invention, the physical blowing agent is carbon dioxide.

According to the invention the polymer granulate is heated to a temperature of between 40° and 120° C., with a range of 50° to 90° C. preferred and a temperature range of between 60° and 80° C. most preferred.

The impregnation of the polymer granulate is carried out at the aforementioned temperatures and at pressures in the range of 15 to 55 bar, with a range of 25 to 45 bar more preferred and a range of 30 to 40 bar most preferred.

According to another embodiment the polymer granulate is dried before being impregnated. This drying step is preferably carried out at a temperature between 40° C. and 130° C., preferably at a temperature between 60° C. and 120° C., preferably at a temperature between 50° C. and 90° C.

According to another embodiment, the impregnated polymer granulate is stored before being used in an injection moulding process. Preferably, after impregnation the polymeric granulate is stored in an atmosphere essentially consisting of carbon dioxide.

According to another embodiment, the impregnated granulate is stored at a pressure at ambient pressure or slightly higher than ambient pressure, for example at an overpressure of 1 to 10 bar or 2 to 5 bar.

DETAILED DESCRIPTION OF THE INVENTION

The combination of the claimed temperatures and claimed pressures will provide for faster penetration of the blowing agent into the grain of the polymeric granulate as the blowing agent will not be trapped only in the edge layer but reach deeper areas of the grain. Further, the temperatures in the range of 40° to 120° C. are consistent with the high granulate temperature that is achieved in an upstream drying step thereby not wasting as much energy with cooling and reheating being necessary.

The impregnated polymeric granulate is used in an injection moulding process. Typically, the polymeric granulate raw material is fed through a hopper into a heated barrel with a reciprocating screw. The screw delivers the polymeric material forward whereby thermal and viscous distributions of the polymer are homogenized. Finally, the polymer material is injected at a high pressure into a mould which shapes the polymer into the desired shape. When the polymer material enters the mould, the pressure drops and the blowing agent bubbles up and gives the product a microcellular structure.

Figure 1:
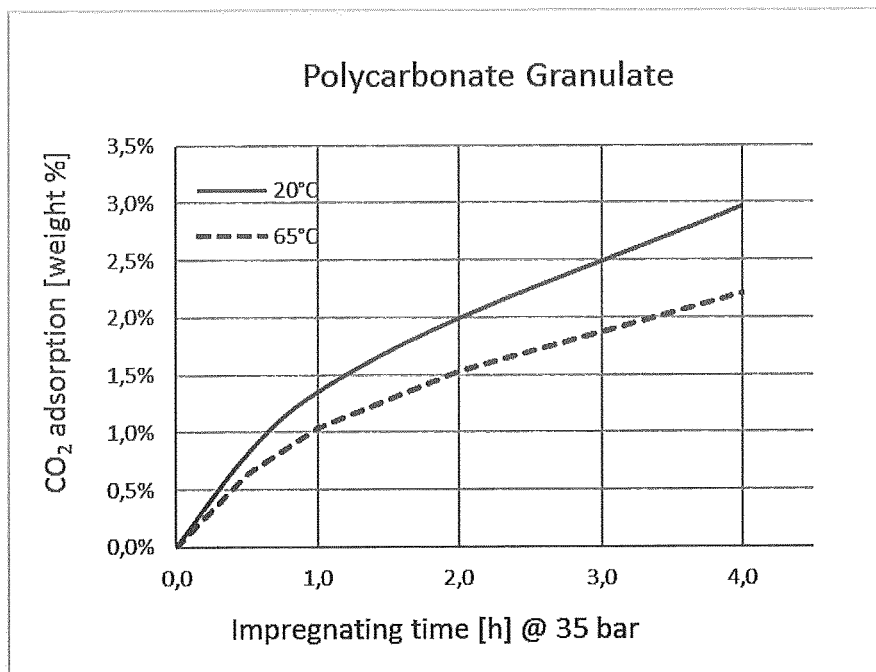
FIG. 1 is a graph showing impregnating time versus carbon dioxide adsorption for different temperatures.

In FIG. 1 the temperature dependency of absorption is shown. The saturation with the blowing agent, carbon dioxide, is reduced with increasing temperature. However, it should be noted that the desorption from the polymeric granulate is slower because the blowing agent must diffuse from deeper areas of the grain to the surface.

The tests further show that the characteristic desorption curves of polymeric granulate impregnated at ambient (20° C.) and higher temperatures cross after a few minutes. A crucial parameter therefore for foam injection moulding is achieving the minimum blowing agent impregnation after a permitted storage time of the impregnated polymeric granulate (e.g., 60 minutes).

Figure 2:
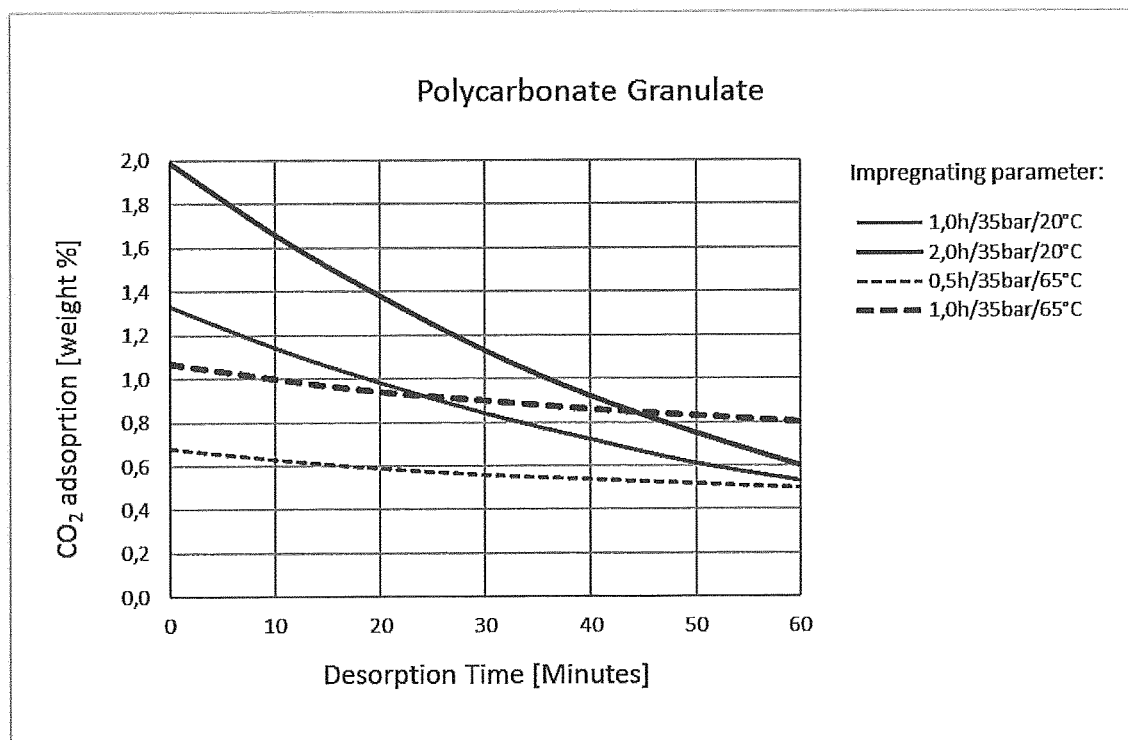
FIG. 2 is a graph showing desorption time versus carbon dioxide adsorption for different pressure and temperature combinations.

FIG. 2 shows a characteristic desorption curve for polycarbonate. Assuming 0.8 weight percent of blowing agent is required to achieve the desired weight saving and the polymeric granulate shall be used for 60 minutes after impregnation. Polymeric granulate impregnated for 1 hour at 65° C. can be used, however polymeric granulate impregnated for twice as long at ambient temperature (20° C.) does not fulfil the requirements.

High pressures, especially in the supercritical range, accelerate the absorption of carbon dioxide. The higher the pressure though, the lower the usage rate for the blowing agent. A vessel having a size of 100 liters filled with 65 liters of granulate polymer has an empty volume of 35 liters. The total amount of carbon dioxide therefore needed to achieve a 1.0 weight percent absorption is 3.0 kilogram at 35 bar and 5.3 kilogram at 70 bar. The unused gas can therefore be collected, compressed and reused for the next batch but the associated cost would not necessarily make such a solution as commercially viable.

Rapid cooling of the polymeric granulate material after impregnation with a blowing agent could further decelerate the desorption. This could negate the advantage achieved regarding energy consumption. Rapid cooling can be achieved especially by running or passing cold gas, in particular air or the physical blowing agent itself, through the granulate. For example, the rapid cooling is carried out in a buffer vessel downstream of the pressure vessel used for impregnation or in the hopper of the injection moulding machine.

Preferably the granulate is cooled down to a temperature below 30° C., preferably to ambient temperature. The rapid cooling of the polymeric granulate to ambient temperature is preferably achieved in less than 15 minutes or less than 10 minutes. The cooling rate is preferably more than 5 K/min or even more than 10 K/min.

According to a preferred embodiment, the impregnated polymeric granulate is stored in a carbon dioxide atmosphere at ambient pressure or slight overpressure. This will also assist in decelerating the desorption of the blowing agent from the impregnated polymeric granulate. Preferably, the exhaust carbon dioxide from the pressure vessel is used to create this carbon dioxide atmosphere.

Further, according to another embodiment of the invention, the impregnated polymeric granulate is stored under a carbon dioxide atmosphere in a buffer vessel or in the hopper of the injection moulding machine. This will also slow the desorption of the blowing agent carbon dioxide.

While this invention has been described with respect to embodiments thereof, it is apparent that numerous other forms and modifications of the invention will be obvious to those skilled in the art. The appended claims in this invention generally should be construed to cover all such obvious forms and modifications which are within the true spirit and scope of the invention.

The invention claimed is:

1. A method for impregnating a polymeric granulate with a physical blowing agent for an injection moulding process, comprising:

drying the polymeric granulate at a temperature of from between 40° C. and 130° C., optionally of from between 50° C. and 90° C., impregnating the polymeric granulate with the physical blowing agent at a temperature of from 40° C. to 120° C. and at a pressure of from 15 to 55 bar before the injection moulding process in an injection moulding machine, and processing the polymeric granulate in the injection moulding machine with the physical blowing agent from the impregnating remaining in the polymeric granulate during the processing.

2. The method of claim 1 wherein the physical blowing agent comprises carbon dioxide.

3. The method of claim 1 wherein the polymeric granulate is selected from the group consisting of thermoplastic resins, thermoset resins, thermoplastic particle foams, granulate for production of thermoplastic particle foams, polypropylene, expanded polypropylene (EPP), polystyrene, expanded polystyrene, and polycarbonate.

4. The method of claim 1 wherein the temperature of at least one of the drying the polymeric granulate and the impregnating the polymeric granulate with the physical blowing agent is selected from the group consisting of 50° C. to 90° C. and 60° C. to 80° C.

5. The method of claim 1 wherein the pressure is selected from the group consisting of 25 bar to 45 bar and 30 bar to 40 bar.

6. The method of claim 1 further comprising cooling the polymeric granulate after the impregnating.

7. The method of claim 1 further comprising storing the polymeric granulate in a carbon dioxide atmosphere.

8. The method of claim 7 wherein the storing the polymeric granulate is at ambient pressure of from 1 bar to 10 bar, optionally from 2 bar to 5 bar.

9. The method of claim 7 further comprising locating the carbon dioxide atmosphere in a hopper of an injection moulding machine for the injection moulding process.

\* \* \* \* \*